Aug. 7, 1945.  J. S. ASKEY  2,381,245

MOLDED CELL FOR FIELD COILS

Filed Dec. 16, 1943

WITNESSES:

INVENTOR
John S. Askey.
BY O. B. Buchanan
ATTORNEY

Patented Aug. 7, 1945

2,381,245

UNITED STATES PATENT OFFICE 2,381,245

MOLDED CELL FOR FIELD COILS

John S. Askey, Mount Lebanon, Pa., assignor to Westinghouse Electric Corporation, East Pittsburgh, Pa., a corporation of Pennsylvania Application December 16, 1943, Serial No. 514,542

4 Claims. (Cl. 171—252)

My invention relates to the first major improvement that has been made in the ground-insulation of class B rotating field-coils for synchronous motors and generators in over twenty years.

In class A insulation (which does not have to stand more than 105° C. of temperature continuously) it is possible to use organic insulating-material, and it has been customary to provide two channel-shaped cells, made of fuller-board, for each field-coil, as shown in the Griffith Patent 1,506,746, granted September 2, 1924, and assigned to the Westinghouse Electric & Manufacturing Company.

In class B insulation (which must be able to withstand a temperature of 150° C. continuously) it is necessary to utilize inorganic insulating material, which has meant mica, asbestos, and, more recently, glass, which is quite expensive. Mica is available in thin, flaky sheets, and is a very satisfactory insulating material except for its lack of mechanical strength and rigidity, and a very troublesome habit of creeping along its surface, and flaking off at the edges. It is relatively impervious or unimpregnable. Asbestos is subject to impurities causing excessive leakage-currents, on account of which it is usually or frequently combined with one or more layers of mica, for breaking up the leakage-paths. It is impregnable, so that it can be impregnated with a suitable binder. Glass is at present rather expensive, and it is not available in altogether desirable forms for this low-cost ground-insulation, either as a cloth, braid, or molded product.

For over twenty years, in view of the foregoing and other limitations in available materials, class B insulation for rotating field-coils has required a "hand-tailored" cell which was built up of five or six layers of mica, which were first laid over the inner surface of the field-coil, where ground-insulation is needed with respect to the shank of the pole-piece. To try to prevent the mica from creeping off at the edges, a sheet of asbestos-cloth was applied over the mica, and tucked in under the edges of the mica, and sewed into place. It was then covered with a heat-hardening phenolic compound, or other binder, blocked into place, with removable hardwood blocks fitting around the curved surfaces, placed (with this blocking) into a steel press, and baked in an oven for as long as 25 hours, in an effort to make the insulation as rigid as possible.

However, because of the presence of the wooden blocks, the heat-treatment was not uniform, and the insulation became suitably hardened only at the edges, where it came into contact with the steel mold. At the bends, the binding-material remained sufficiently soft to let the mica creep, so that the insulation was weak, and more subject to failure, at the bends. Moreover, the process was obviously expensive. In recent times, mica has been scarce, and hard to obtain in necessary quantities, as well as the woven or cloth-form of asbestos.

The object of my present invention is to provide an improved preformed molded cell for use in a rotating field-coil of a dynamo-electric machine, using class B insulation which is hardened all over, before being applied to the coil, and which is much more economical in cost, saving in critical or scarce materials, and better in performance than previous ground-insulations for rotating field-coils.

With the foregoing and other objects in view, my invention consists in structures, combinations, parts, materials and processes hereinafter described and claimed, and illustrated in the accompanying drawing, wherein, Figure 1 is a cross-sectional view of a pole-piece of the rotor-member of a synchronous machine, with two of my improved cells serving as the ground-insulation for a field-coil;

Figure 1:
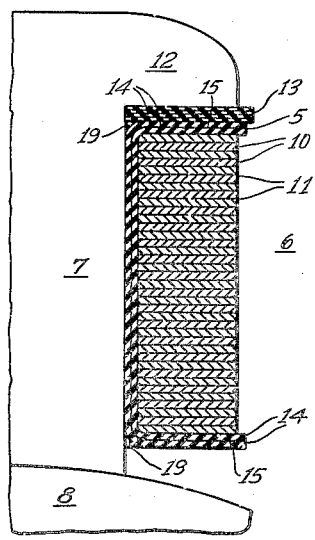
Figure 2:
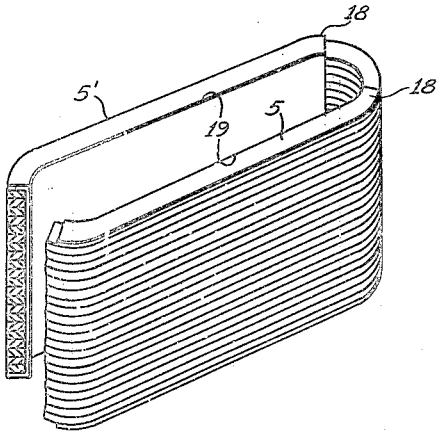
Fig. 2 is a perspective view of the field-coil with the insulating cells in place.
Figure 3:
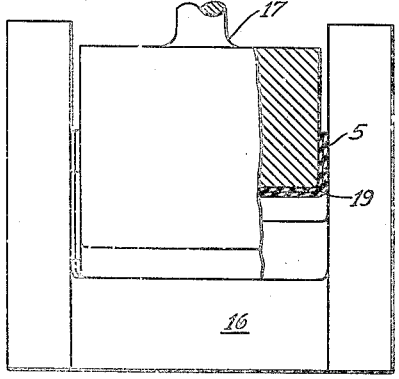
Figs. 3 and 4 are partly sectional end and side views, respectively, of a mold, with one of my cells in place in the process of making it.
Figure 4:
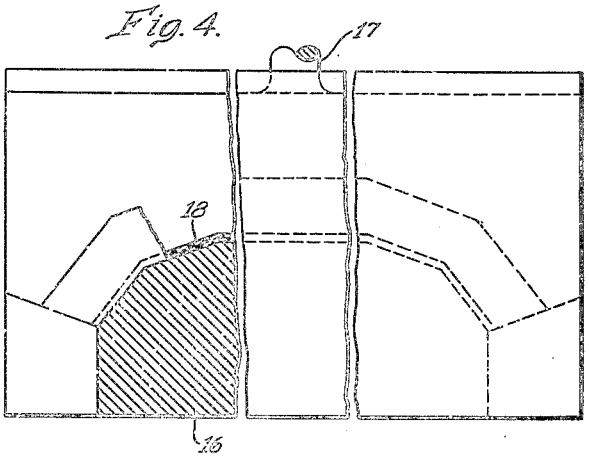

In Figs. 1 and 2, two of my preformed, molded cells are shown at 5 and 5', in connection with a field-coil 6 on a salient pole-piece 7 which is secured to the rotor-spider 8 of a synchronous machine, or other dynamo-electric machine, particularly a machine requiring class B insulation, which is inorganic material, used with such structural materials of organic source which will not affect the insulating properties at 150° C.

The coil 6 is illustrated as a plurality of turns of edge-wound copper strap 10, separated by thin layers 11 of asbestos or other inorganic insulation. It is mounted on the shank of the pole-piece 7, and is separated from the pole-face or tip 12 by an insulating washer or collar 13.

Figure 5:
Fig. 5 is an enlarged sectional view illustrating the composition of the cell.

As shown in Fig. 5, the cell 5 (or 5') is formed of a plurality of sheets or layers 14 of asbestos paper, or other impregnable, flexible sheets of inorganic insulating material, or insulating material which will stand more than 125° C. continuously. As many layers may be used as are required by the voltage in question. Two layers 14 are illustrated. This asbestos paper is first treated (or impregnated) with a heat-hardening resin, or other hardenable insulating binding-material, before the asbestos paper 14 is built up into a multi-layer thickness.

When the initially flexible, impregnated, insulating layers 14 are of asbestos, it is sometimes desirable to sandwich one (or more) layers of mica 15, somewhere in between the asbestos or other impregnated layers 14, usually in the middle, to provide an adequate factor of safety against leakage-currents through the insulation, although my treatment of the asbestos, with the resin, very greatly reduces its leakage, as compared to ordinary, untreated, asbestos. In the illustrated example, I utilize a single layer of mica 15.

The piled-up layers 14, or 14 and 15, are placed within a suitably shaped steel mold 16, and pressed with a steel plunger 17, in an oven (not shown), for less than one hour, to form a channel-shaped member or cell 5, having bent ends 18. Since all parts of the cell are in contact with the metal mold and plunger, during this combined heating and pressure-operation, the cell 5 is converted into a single, mechanically rigid, integral piece, which is hard and mechanically rigid at all portions thereof. The uniform hardness of the hardened binder combines with the channel-shape of the cell 5, to produce well-hardened, small-radius bends 19 which prevent creepage of the mica 15 at said bends.

My new molded field-coil cell uses only 20% as much mica as was formerly required. In one year's operation of the Westinghouse Electric & Manufacturing Company, this means a yearly saving of more than 41,000 pounds of war-scarce mica, in the manufacture of ground-insulation for a certain type of rotating field-coils having class B insulation.

My new insulation requires no asbestos cloth at all, another war-scarce material.

It requires less than one-twenty-fifth as much oven-capacity as was formerly required for field-coil ground-insulation, thus overcoming a shortage in ovens.

It effects a saving of $6.15 per coil, or approximately $100,000 per year, in round numbers, at the Westinghouse Electric & Manufacturing Company, with promise of still further applications of the invention.

And it results in a ground-insulation which is stronger and better than formerly.

I claim as my invention:

1. A preformed molded cell adapted for use in a rotating field-coil of a dynamo-electric machine, comprising a channel-shaped member having bent ends made in one mechanically rigid integral piece composed of a plurality of layers of molded sheets of initially flexible impregnable insulating material which will stand a temperature of more than 125° C. continuously, one or more layers of mica sandwiched between said impregnable layers, and an impregnating binder of a hardenable insulating material which will bind said sheets together into an integral piece which is hard and mechanically rigid at all portions thereof, the channel-shape having well-hardened small-radius bends which prevent creepage of the mica at said bends.

2. The invention as defined in claim 1, characterized by said impregnable layers being of inorganic material.

3. The invention as defined in claim 1, characterized by said impregnable layers being of asbestos.

4. The invention as defined in claim 1, characterized by said impregnable layers being of asbestos, and said binder being a heat-hardening resin which reduces the leakage of the asbestos.

JOHN S. ASKEY.